(12) United States Patent
Karasawa

(10) Patent No.: US 7,215,671 B1
(45) Date of Patent: May 8, 2007

(54) INFORMATION PROCESSING APPARATUS AND METHOD

(75) Inventor: Katsumi Karasawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,056

(22) Filed: Mar. 14, 2000

(30) Foreign Application Priority Data

Mar. 16, 1999 (JP) ................................. 11-070849
Jun. 1, 1999 (JP) ................................. 11-154154

(51) Int. Cl.
*H04L 12/56* (2006.01)

(52) U.S. Cl. ................ 370/395.1; 370/474; 348/423.1; 378/240

(58) Field of Classification Search ................ 370/389, 370/385, 470, 471, 475, 522; 348/423.1, 348/426.1, 461, 464
See application file for complete search history.

(56) References Cited

U.S. PATENT DOCUMENTS

| | | | | |
|---|---|---|---|---|
| 5,321,440 A * | 6/1994 | Yanagihara et al. | ......... | 348/408 |
| 5,440,345 A * | 8/1995 | Shimoda | ..................... | 348/411 |
| 5,546,409 A | 8/1996 | Karasawa | .................. | 371/37.4 |
| 5,561,529 A | 10/1996 | Tanaka et al. | ................. | 386/77 |
| 5,598,415 A * | 1/1997 | Nuber et al. | ................. | 370/474 |
| 5,602,595 A * | 2/1997 | Citta et al. | .................. | 348/495 |
| 5,726,989 A * | 3/1998 | Dokic | ......................... | 370/509 |
| 5,784,112 A | 7/1998 | Ogasawara et al. | ......... | 348/423 |
| 5,801,781 A * | 9/1998 | Hiroshima et al. | ......... | 348/441 |
| 5,838,678 A * | 11/1998 | Davis et al. | ................. | 370/389 |
| 5,847,779 A * | 12/1998 | Acampora et al. | ..... | 375/240.26 |
| 6,052,814 A | 4/2000 | Karasawa | ................... | 714/755 |
| 6,058,109 A * | 5/2000 | Lechleider | .................. | 370/352 |
| 6,172,972 B1 * | 1/2001 | Birdwell et al. | ............ | 370/349 |
| 6,252,887 B1 * | 6/2001 | Wallace | ...................... | 370/466 |
| 6,262,990 B1 * | 7/2001 | Ejiri | ........................... | 370/412 |
| 6,333,950 B1 * | 12/2001 | Karasawa | ................... | 375/240 |
| 6,430,198 B1 * | 8/2002 | Moyal et al. | ................ | 370/473 |
| 6,460,086 B1 * | 10/2002 | Swaminathan et al. | ..... | 709/236 |
| 6,463,060 B1 * | 10/2002 | Sato et al. | .................. | 370/389 |

* cited by examiner

*Primary Examiner*—Huy D. Vu
*Assistant Examiner*—Roberta A. Shand
(74) *Attorney, Agent, or Firm*—Fitzpatrick, Cella, Harper & Scinto

(57) ABSTRACT

There is disclosed an information processing apparatus/method comprises inputting variable length packet data including packet length information indicative of a packet length and encoded information data, and identification flag information for identifying the packet length information, distinguishing the packet length information included in the packet data in accordance with the identification flag information and judging the packet length of the packet data, and generating the variable length packet data into fixed length packet data in accordance with the judgment result and transmitting the fixed length packet data.

14 Claims, 10 Drawing Sheets

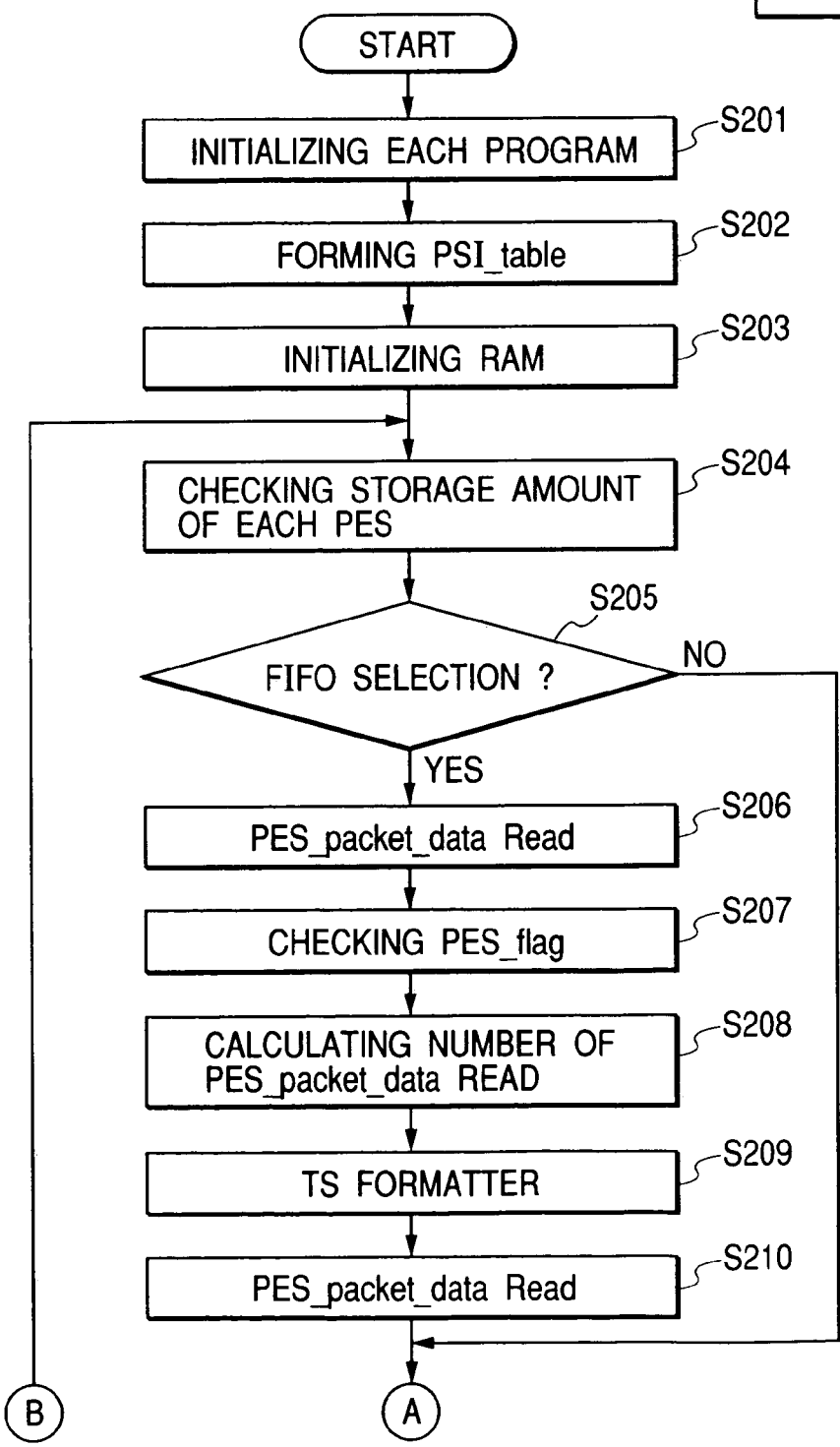

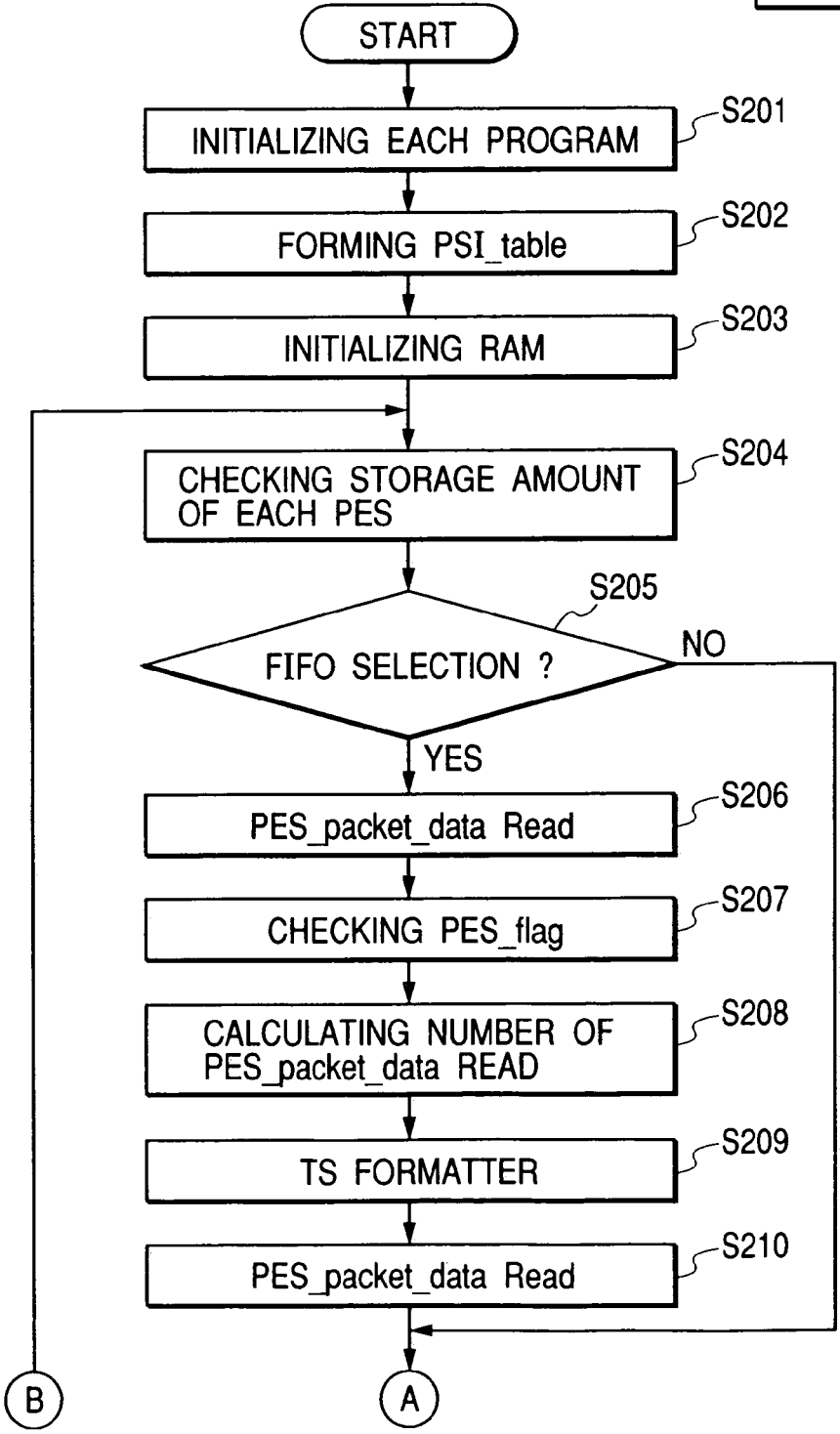

INFORMATION PROCESSING APPARATUS AND METHOD

BACKGROUND OF THE INVENTION

1. Field of the Invention

The present invention relates to an information processing for converting variable length packet data to fixed length packet data.

2. Related Background Art

In recent years, a digital processing system conforming to two standards [International Organization for Standardization/International Electrotechnical Commission (ISO/IEC) 13818-1 to 3] of Moving Picture Experts Group (MPEG) has been standardized as a video transmission system.

FIG. 1 is a block diagram showing the transmission-side constitution of a general digital transmission apparatus which conforms to ISO/IEC 13818-1 to 3.

In FIG. 1, reference numeral 301 denotes a video encoder for compressing digital video data in conformity with ISO/IEC 13818-2, and 302 denotes an audio encoder for compressing digital audio data in conformity with ISO/IEC 13818-3.

Reference numeral 303 denotes a packetizer for packetizing a video elementary stream outputted from the video encoder 301 in accordance with Packetized Elementary Stream (PES) of ISO/IEC 13818-1, 304 denotes a packetizer for packetizing an audio elementary stream outputted from the audio encoder 302 in accordance with PES of ISO/IEC 13818-1, and 305 denotes a TS multiplexer for packetizing and multiplexing the video PES and audio PES outputted respectively from the packetizers 303, 304 into a transport stream packet in accordance with Transport Stream (TS) of ISO/IEC 13818-1.

The operation will next be described.

The video data and audio data are inputted to the video encoder 301 and audio encoder 302, respectively. The video encoder 301 checks information highly correlative in space and time in conformity with ISO/IEC 13818-2, and performs conversion to data with a low redundancy to compress the information amount. The audio encoder 302 compresses the information amount in conformity with ISO/IEC 13818-3.

In a string of these compressed data, a unit which can be extended alone is called an access unit (AU), and the data strings of video AU and audio AU are called a video elementary stream (video ES) and an audio elementary stream (audio ES), respectively. The video ES and audio ES are inputted to the packetizers 303, 304, respectively, and are packetized (PES) into a variable length packet together with the stream ID indicating the ES attribute and the time stamp information indicating decoding time or display time on decoding side usually by a unit on the basis of the access unit.

The TS multiplexer 305 receives the video PES and audio PES, performs conversion to the transport stream (TS), and emits an output.

FIG. 2 is a block diagram showing the detailed constitution of the TS multiplexer 305.

In FIG. 2, numeral 306 denotes a memory such as RAM for storing inputted video PES, 307 denotes a memory such as RAM for storing inputted audio PES, and 308 and 309 denote TS packetizers for converting the video and audio PES stored in the memories 306', 307 to the transport stream packet in conformity with ISO/IEC 13818-1.

Numeral 310 denotes a memory for generating and storing the overall auxiliary TS information such as the PID definition described in ISO/IEC 13818-1 as Program Specific Information (PSI), 311 denotes a PCR generator for generating Program Clock Reference (PCR) indicating a reference time which defines a reception time on the decoding side, and 312 denotes a rate converting FIFO for performing rate adjustment in accordance with a transmission line.

The operation of the TS multiplexer 305 for receiving the video PES shown in FIG. 3 by the above-described constitution will be described hereinafter.

The video PES with a code length of 340 bytes per 1 PES as shown in FIG. 3 is inputted and written to the memory 306. Additionally, the start code (packet_start_code_prefix: 0x000001) of the video PES is detected, and the code length of 1 PES is counted.

Subsequently, data is transferred to the TS packetizer 308 from the memory 306. The TS packetizer 308 performs packetizing so that the top byte of the video PES is disposed on the top of the payload of the transport stream packet as shown in FIG. 3 based on the previously measured PES length. Moreover, when the data length is less than 184 bytes as in a second transport stream packet of FIG. 3, an adaptation field is inserted, and then a stuffing byte (0xFF) for adjustment to obtain a unit of 184 bytes is inserted. Furthermore, the processing operation similar to the above is performed on the audio PES.

Each data converted to the packet with a fixed length as described above is subjected to rate conversion in the FIFO 312 in accordance with the transmission line, and outputted as TS. Moreover, the overall auxiliary TS information such as the PID definition is generated as PSI, stored in the memory 310, and packetized to form the TS packet having a predefined PID.

The PCR generator 311 generates PCR indicating the reference time which defines the reception time on the decoding side, and multiplexing is performed within a period of 100 ms in accordance with ISO/IEC 13818-1. Furthermore, PCR is supplied to each program. Additionally, since PCR has to be outputted as TS within the period of 100 ms as described above, the PID for PCR is defined in PSI usually separately from the video PES and audio PES, and the packetizing is performed to obtain the TS packet constituted only of the packet header including the PID, and the adaptation field.

The TS multiplexer 305 reads the respective TS packets from respective buffers by the unit of TS packet at appropriate timings, and outputs TS. In this case, when there is no effective TS packet corresponding to the fixed rate transmission line, a null packet (stuffing packet, hereinafter referred to also as "stuffing data") defined in ISO/IEC 13818-1 is inserted.

In the above-described data multiplexing method in the digital transmission apparatus, the packetizing processing is very complicated, and there is a problem that the hardware amount increases with the increase of programs to be multiplexed.

For example, when the audio PES shown in FIG. 3 is converted to the TS packet, the adaptation field is inserted, and the stuffing byte for setting the packet data length to be constant has to be multiplexed. Moreover, a buffer of 1 PES or more has to be provided to measure the 1 PES length, and the delay amount also increases.

Furthermore, the number of programs to be multiplexed is determined by the hardware configuration of the TS multiplexer. For example, the TS multiplexer 305 of FIG. 2 can transmit only one program, and has to include the memories 306, 307, TS packetizers 308, 309 and PCR generator 311 for the number of programs in order to multiplex a plurality of programs.

In this case, data lines for transmission/reception between each program encoder and TS multiplexer also increase.

SUMMARY OF THE INVENTION

In the above-described background, an object of the present invention is to provide an information processing apparatus and method in which a packetizing processing is simplified, delay processings are reduced, and even the increase of programs to be multiplexed can be handled.

To attain the object, according to one aspect of the present invention, there is provided an information processing apparatus/method comprising: inputting variable length packet data including packet length information indicative of a packet length and encoded information data, and identification flag information for identifying the packet length information; distinguishing the packet length information included in the packet data in accordance with the identification flag information and judging the packet length of the packet data; and generating fixed length packet data from the variable length packet data in accordance with the judgment result and transmitting the fixed length packet data.

According to another aspect of the present invention, there is provided an information processing apparatus comprising: encoding means for encoding information data, generating variable length packet data including packet length information indicative of a packet length and generating identification flag information for identifying the packet length information; and converting means for distinguishing the packet length information included in the packet data in accordance with the identification flag information generated by the encoding means, judging the packet length of the variable length packet data, and converting the variable length packet data to fixed length packet data. The encoding means is connected to the converting means via at least a data bus for transmitting the variable length packet data and flag bus for transmitting the identification flag information.

According to further aspect of the present invention, there is provided an information processing apparatus/method comprising: generating variable length packet data including encoded information data; generating and transmitting fixed length packet data from the generated variable length packet data; generating clock reference information for use in a time reference during decoding of the encoded information data, wherein in the fixed length packet data generation processing, the fixed length packet data including the clock reference information is generated and the generated fixed length packet data is transmitted within a predetermined time interval, and the fixed length packet data including the clock reference information is transmitted when there is no effective fixed length packet data.

According to still further aspect of the present invention, there is provided an information processing apparatus/method comprising: generating variable length packet data including encoded information data; generating and transmitting fixed length packet data from the generated variable length packet data; generating program specific information indicative of program specific of the fixed length packet data, wherein in the fixed length packet data generation processing, the fixed length packet data including the program specific information is generated and the generated fixed length packet data is transmitted within a predetermined time interval, and the fixed length packet data including the program specific information is transmitted when there is no effective fixed length packet data.

Other objects, features and advantages of the invention will become apparent from the following detailed description taken in conjunction with the accompanying drawings.

DETAILED DESCRIPTION OF THE PREFERRED EMBODIMENTS

Embodiments of the present invention will be described hereinafter with reference to the drawings.

In the present embodiment, it will be described as one example that video data encoded by International Telecommunication Union-Telecommunication Standardization Sector (ITU-T) Recommendation H. 222.0: ISO/IEC 13818-2 is system-encoded by ITU-T Recommendation H. 222.0: ISO/IEC 13818-1.

Figure 1:
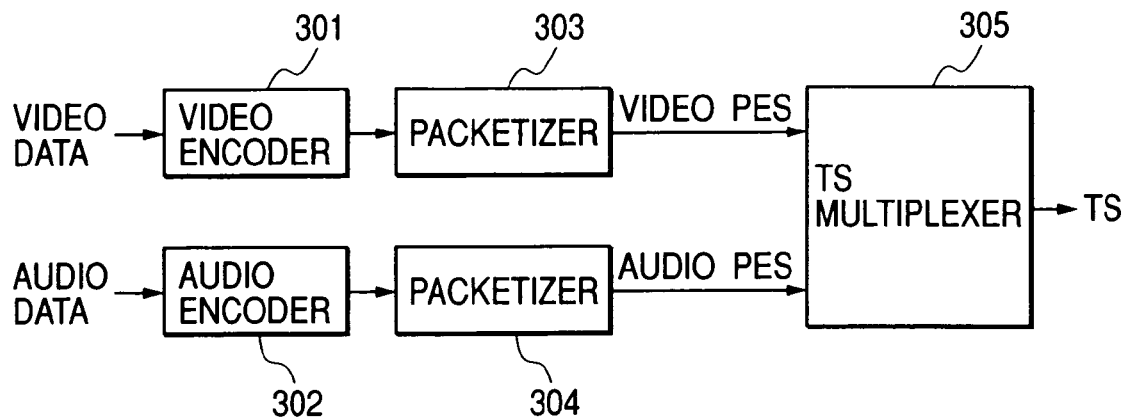
FIG. 1 is a block diagram showing the transmission-side constitution of a general digital transmission apparatus which conforms to ISO/IEC 13818-1 to 3.
Figure 2:
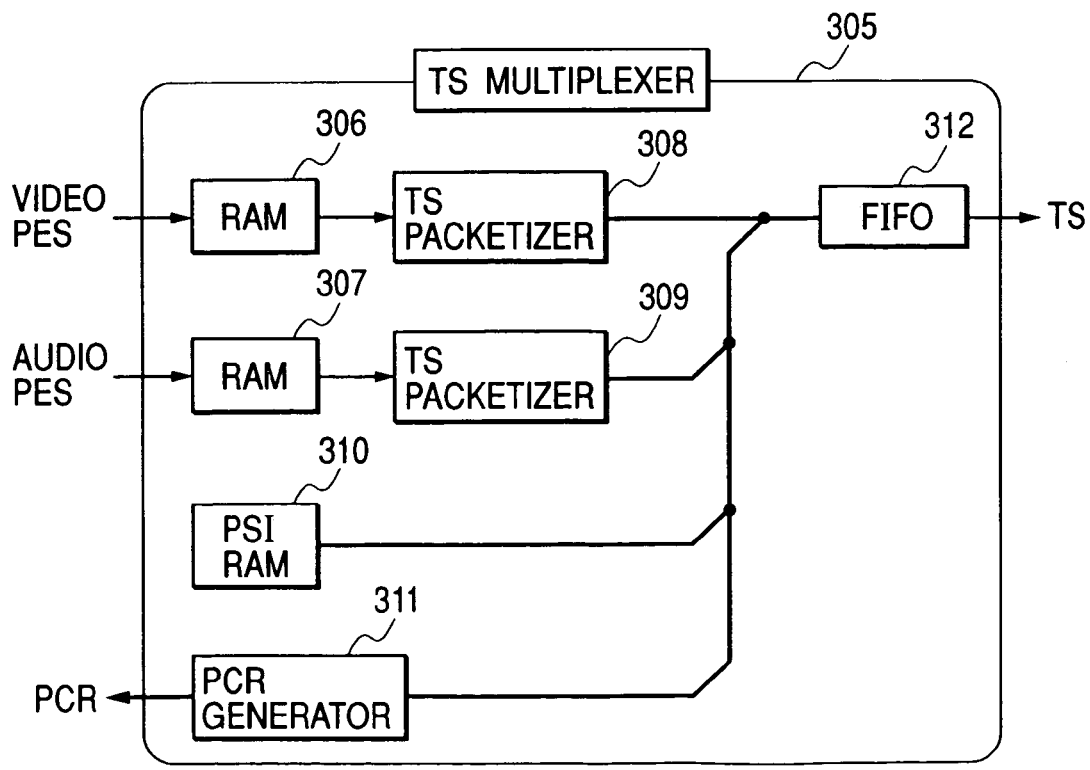
FIG. 2 is a block diagram showing the detailed configuration of a TS multiplexer 305.
Figure 3:
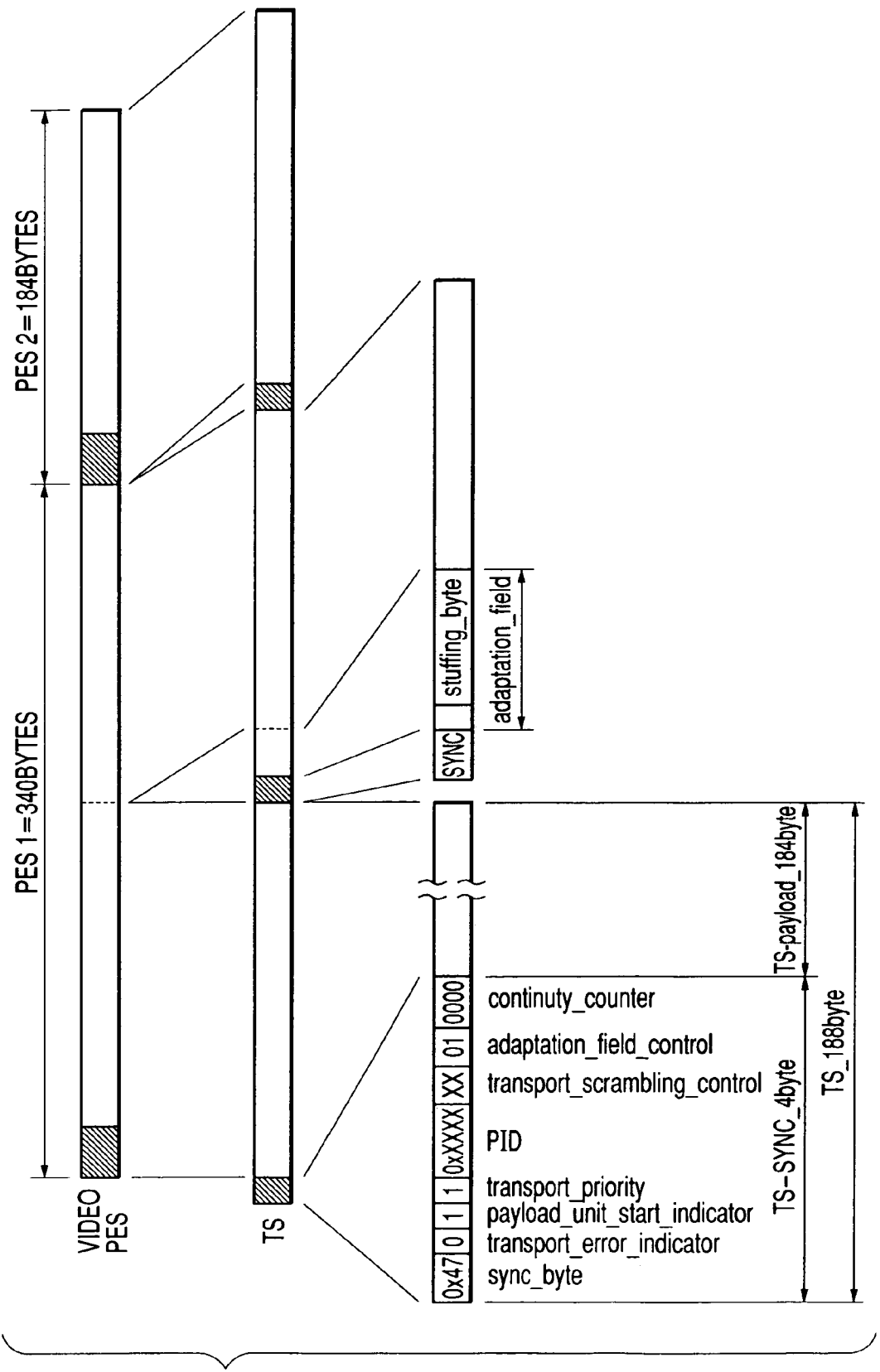
FIG. 3 is an explanatory view showing a conventional PES/TS conversion format.
Figure 4:
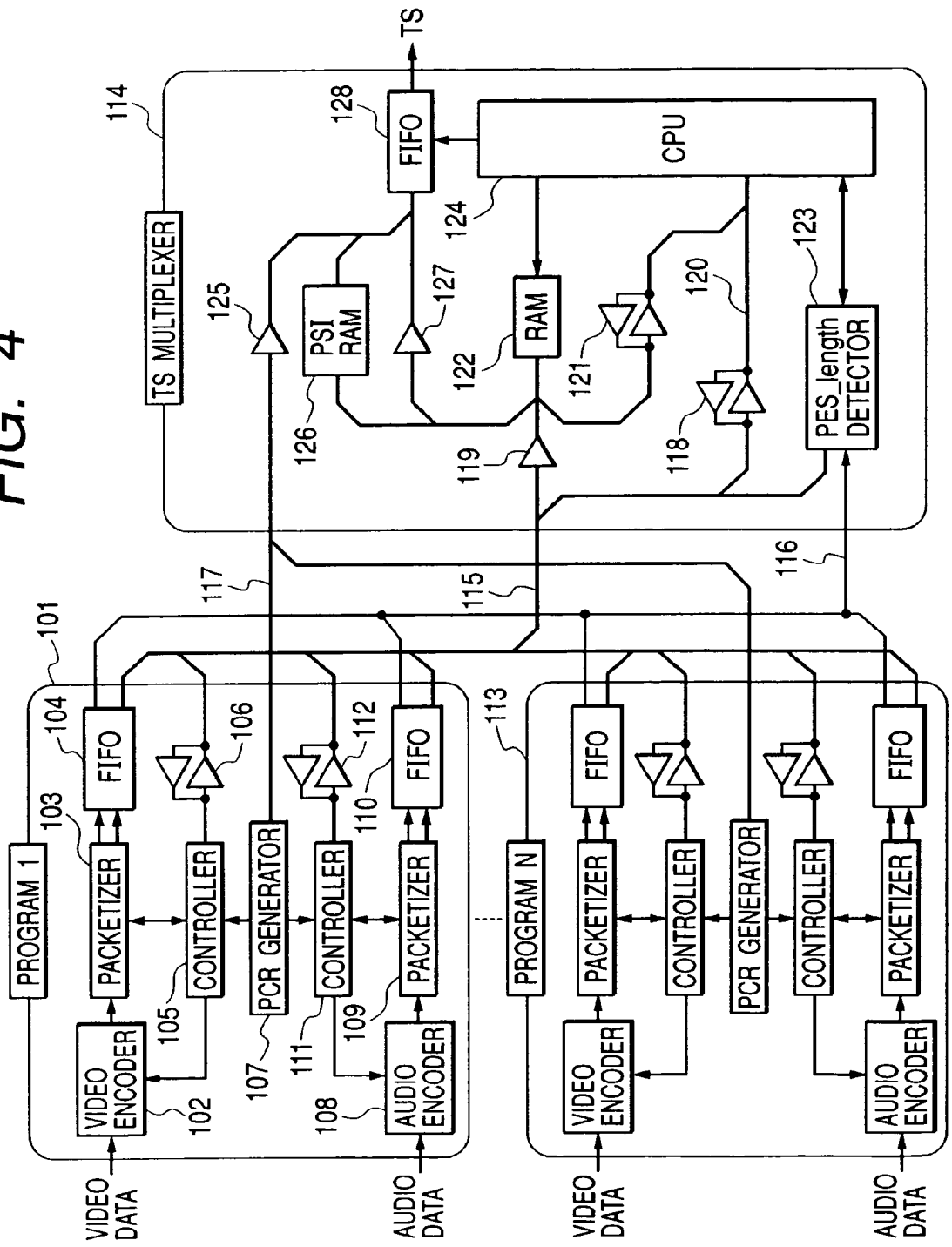
FIG. 4 is a block diagram showing the constitution of the present digital transmission apparatus.

FIG. 4 is a block diagram showing the configuration of a digital transmission apparatus according to the present embodiment.

In FIG. 4, a plurality of digital video data and digital audio data are inputted to program encoders 101, . . . , 113 (corresponding to Program 1 to N) defined by ITU-T Recommendation H. 222.0: ISO/IEC 13818-1. The inputted digital video data is compressed by a video encoder 102 in conformity with ITU-T Recommendation H. 222.0: ISO/IEC 13818-2, and outputted as a video elementary stream.

The outputted video elementary stream is inputted to a packetizer 103. In the packetizer 103, the stream is converted to a packetized elementary stream (PES) indicated in ITU-T Recommendation H. 222.0: ISO/IEC 13818-1. Here, for a packetized information length, in consideration of the data error of a transmission line, packetizing is performed, for example, for each slice indicated in the ITU-T Recommendation H. 222.0: ISO/IEC 13818-2.

On the other hand, the inputted digital audio data is compressed by an audio encoder 108 in conformity with the ITU-T Recommendation H. 222.0: ISO/IEC 13818-3, and outputted as an audio elementary stream. The outputted audio elementary stream is inputted to a packetizer 109. In the packetizer 109, the stream is converted to a packetized elementary stream (PES) indicated in the ITU-T Recommendation H. 222.0: ISO/IEC 13818-1.

Figure 5:
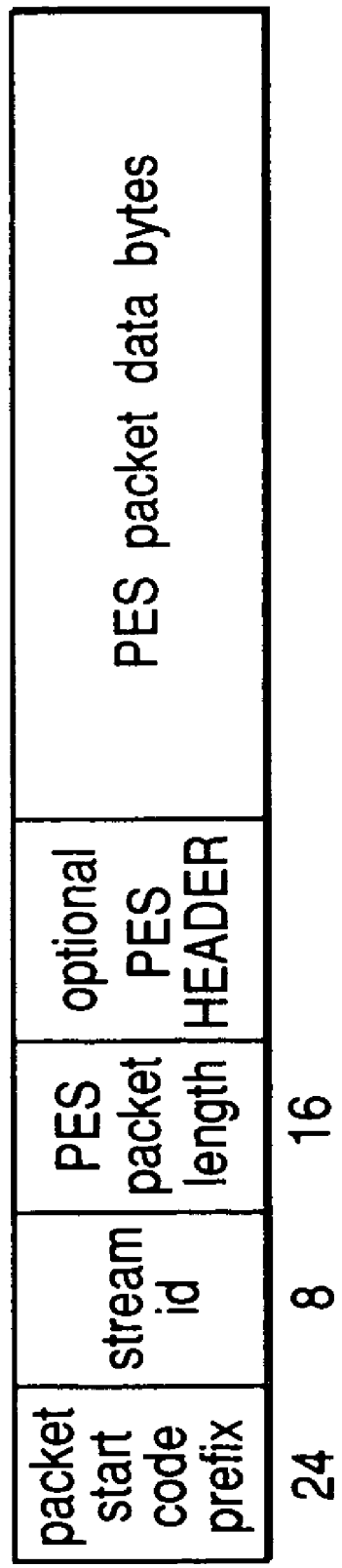
FIG. 5 is an explanatory view showing the data structure of a PES packet.

Additionally, FIG. 5 shows the data structure of the PES packet. In FIG. 5: packet_start_code_prefix: The packet_start_code_prefix is a 24-bit code. Together with the stream_id that follows it constitutes a packet start code that identifies the beginning of a packet. The packet_start_code_prefix is the bit string 0x000001. stream_id: In Program Streams, the stream_id specifies the type and number of the elementary stream. PES_packet_length: A 16 bit field specifying the number of bytes in the PES packet following the last byte of the field. A value of 0 indicates that the PES packet length is neither specified nor bounded and is allowed only in PES packets whose payload is a video elementary stream contained in Transport Stream packets.

Turning back to the description of FIG. 4, the video PES and audio PES packetized in the packetizers 103, 109 are stored in FIFO 104, 110, respectively. Moreover, the packetizers 103, 104 generate flag information which can be identified by the unit of 1 PES as described later, and store the information together with PES in the FIFO 104, 110.

A PCR generator 107 is a counter for generating program_clock_reference_base and program_clock_reference_extension for system synchronization indicated in the ITU-T Recommendation H. 222.0: ISO/IEC 13818-1. The program_clock_reference_base generated in the PCR generator 107 is supplied to controllers 105, 111.

The controllers 105, 111 control the encoding of the video data, the encoding of audio data and the packetizing. Moreover, upon receiving program_clock_reference_base from the PCR generator 107, presentation_time_stamp indicated in the ITU-T Recommendation H. 222.0: ISO/IEC 13818-1 is inserted.

The video PES and audio PES accumulated in the FIFO 104, 110 are inputted to a TS multiplexer 114 via a CPU/PES data bus 115. Furthermore, PES identification flag information is inputted to the multiplexer 114 via a flag bus 116. Additionally, in the present embodiment, the CPU/PES data bus 115 has a width of 16 bits, and the flag bus 116 has a width of one bit.

The video PES and audio PES inputted via the CPU/PES data bus 115 are written to a RAM 122 via a buffer 119, and further supplied to a PES_length detector 123. Moreover, the PES identification flag information inputted via the flag bus 116 is supplied to the PES_length detector 123.

A CPU 124 reads PES_packet_length included in a PES header from the detection result of the PES_length detector 123, and converts the video PES and audio PES written in the RAM 122 to a transport stream packet in conformity with the ITU-T Recommendation H. 222.0: ISO/IEC 13818-1. The data converted to the transport stream packet is transferred to FIFO 128 via a buffer 127 from the RAM 122.

In the FIFO 128, the rate conversion is performed in accordance with the transmission line and TS is outputted. Moreover, the CPU 124 grasps each program state via bi-directional buffers 118, 106, 112 from a CPU data bus 120, generates PSI indicated in the ITU-T Recommendation H. 222.0: ISO/IEC 13818-1, and writes PSI to PSI/RAM 126 via a bi-directional buffer 121.

At the above-described rate conversion of the FIFO 128, the CPU 124 performs the multiplexing control of the respective data (video TS, audio TS, PSI, PCR).

Figure 6B:
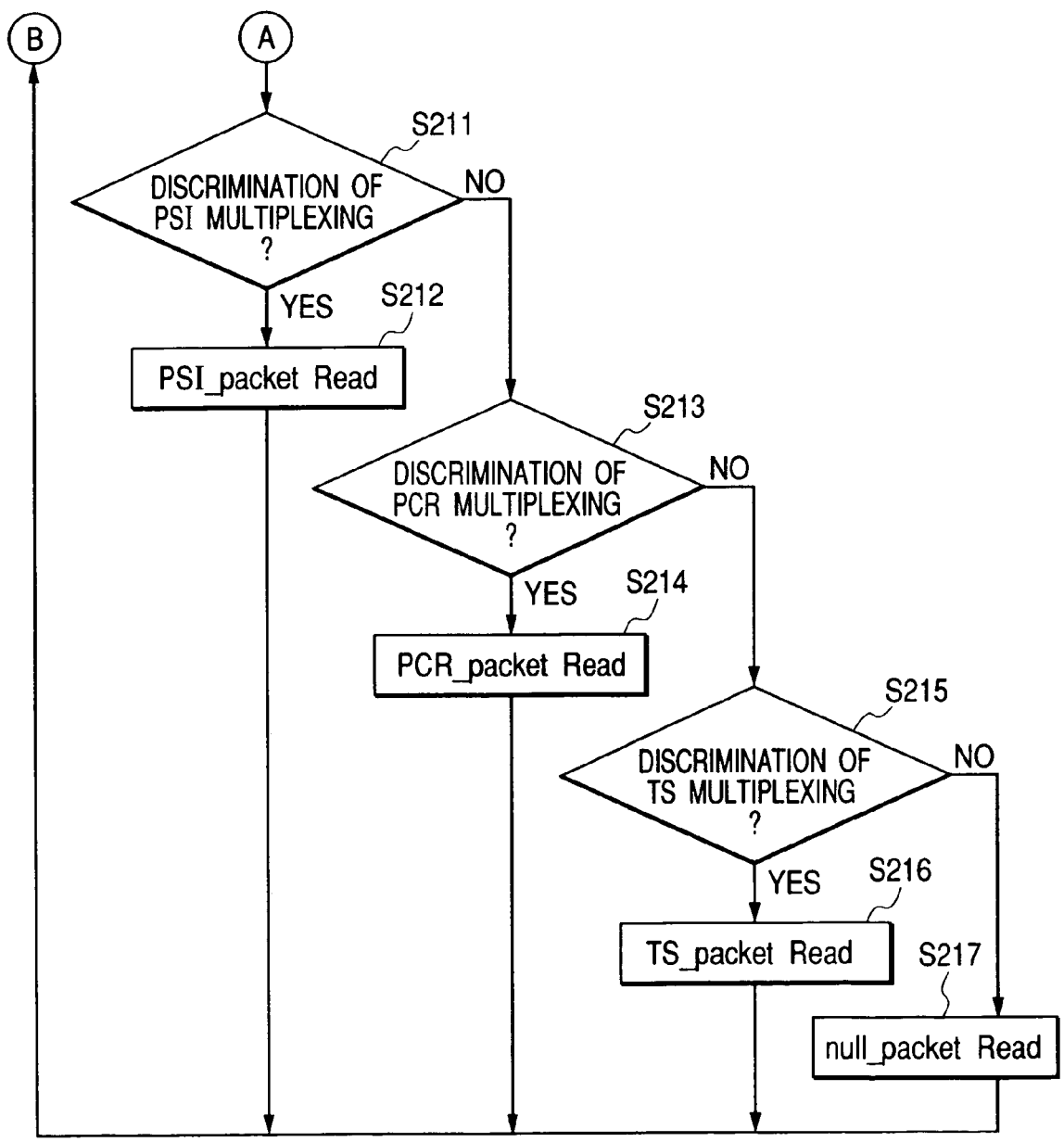
FIG. 6 is comprised of FIGS. 6A and 6B are flowcharts showing the operation of the digital transmission apparatus of FIG. 4.

A detailed processing operation in the digital transmission apparatus constituted as described above will be described hereinafter with reference to a flowchart of FIG. 6.

First, in step S201, each program state is grasped from the CPU 124 via the CPU data bus 120 and bi-directional buffers 118, 106, 112, parameters, and the like necessary for encoding are supplied in accordance with each state, and the controllers 105, 111 are controlled. The controllers 105, 111 controlled by the CPU 124 control the encoders 102, 108, respectively.

Subsequently, in step S202, the PSI is generated in accordance with each program state grasped in the step S201, and written to the PSI/RAM 126 from the CPU 124 via the CPU data bus 120 and bi-directional buffer 121. In step S203, the pattern of data "0xFF" (stuffing bytes) is written to all areas for use of the RAM 122 from the CPU 124.

In step S204, the CPU 124 reads the storage amount (FIFO 104, 110) of each video packetized elementary stream and audio packetized elementary stream via the CPU data bus 120 and bi-directional buffers 118, 106, 112. Here, the controllers 105, 111 have a function of monitoring the writing amount to the FIFO 104, 110 from the packetizers 103, 109.

In step S205, the FIFO having the most storage amount is selected from the read FIFO having the storage amounts which exceed a given value. For example, supposing that the FIFO 104 is selected, in the next step S206 the CPU 124 transmits a command to the controller 105 via the CPU data bus 120 and bi-directional buffers 118, 106 to read three words of stored data of the FIFO 104. The controller 105 receives this read command, and outputs the number of data designated by the FIFO 104 to the CPU/PES data bus 115. Moreover, the same number of PES identification flags are outputted to the flag bus 116.

Figure 7:
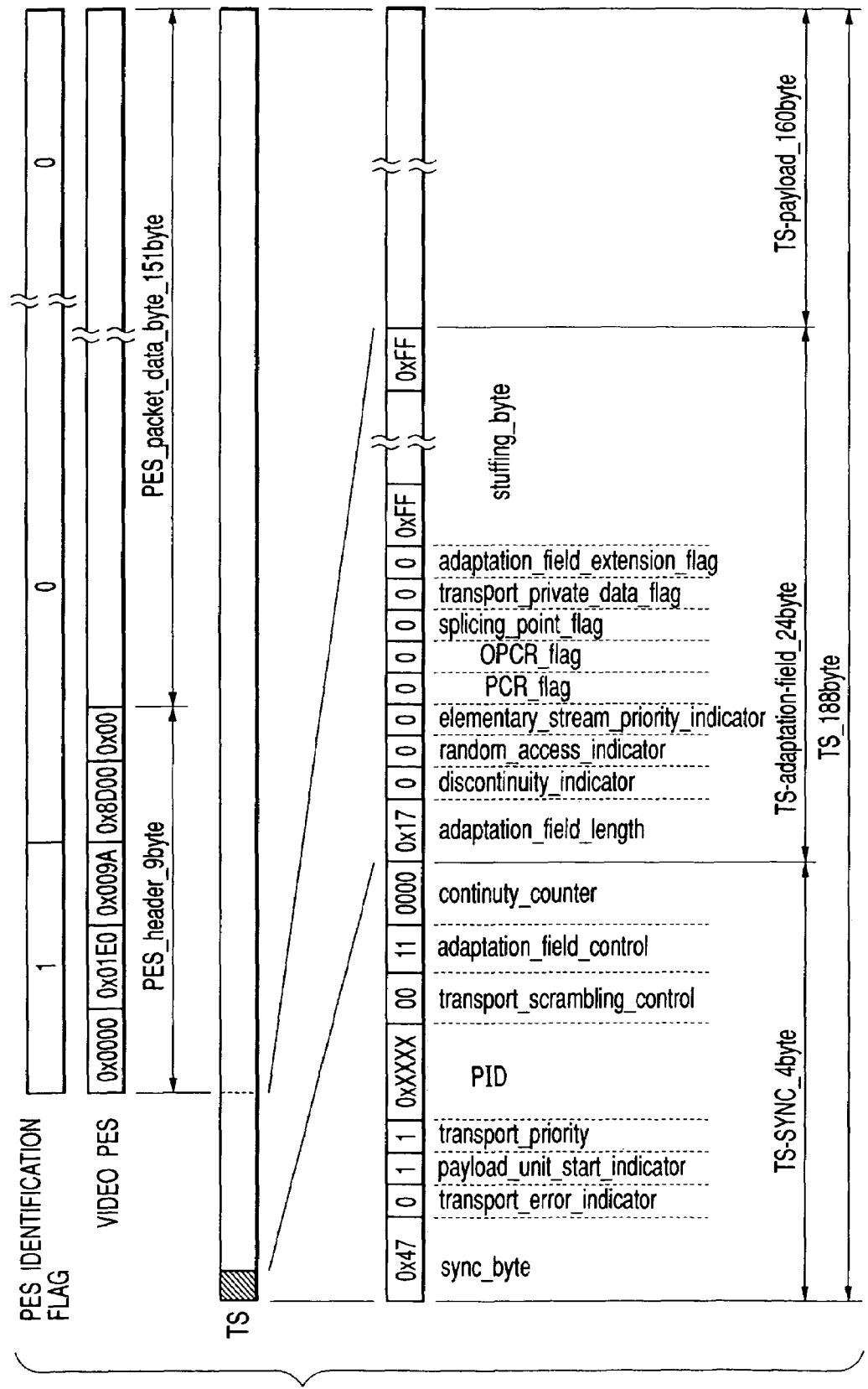
FIG. 7 is an explanatory view showing the present PES/TS conversion format.

The video PES and PES identification flag information accumulated in the FIFO 104 in this case are shown in FIG. 7.

In step S206, three words (0x0000, 0x01E0, 0x009A) of the video PES shown in FIG. 7 are supplied to the buffer 119 and PES_length detector 123, and the PES identification flags (1, 1, 1) for the three words are supplied to the PES_length detector 123.

In step S207, the PES_length detector 123 holds, from the supplied PES identification flags, PES_packet_length (0x009A in FIG. 7) which is the code length of the video PES, and the CPU 124 reads this code length.

In step S208, the amount of information read from the FIFO 104 is calculated from the PES code length read by the CPU 124.

In FIG. 7, since the PES code length is 160 bytes, and the information of three words (6 bytes) are already read, the remaining number of data is 154 bytes (77 words). Since the payload length of the transport stream packet is 184 bytes (92 words) at maximum, all the 77 words of the remaining PES data can be multiplexed, and the insertion of the adaptation field for 12 words (=92 words−(77+3) words) is necessary.

In step S209, from the calculation result of the step S208, one word in total of TS-SYNC (4 bytes) and adaptation_field_length and its annexed flag information (1 byte) of the adaptation field (12 words) excluding the stuffing byte is written to the RAM 122 from the CPU 124 via the bi-directional buffer 121. Here, the stuffing byte in the adaptation field becomes unnecessary by the RAM initialization of the step S203. Moreover, the PES data (3 words) held in the buffer 119 in the step S206 are written to the RAM 122.

In step S210, the CPU 124 transmits the read command for 77 words of the stored data of the FIFO 104 to the controller 105 via the bi-directional buffers 118, 106. The controller 105 receives this read command, outputs the data for 77 words to the CPU/PES data bus 115 from the FIFO 104, and additionally outputs the same number of PES identification flags to the flag bus 116. In this case, the CPU 124 designates a writing address and writes the data for 77 words inputted via the CPU/PES data bus into the RAM 122 via the buffer 119.

Until the above-described step S210, one transport stream packet is completed.

Subsequently, in step S211, the CPU 124 checks the PSI transmission period defined in the ITU-T Recommendation H. 222.0: ISO/IEC 13818-1. If the multiplexing is necessary, in step S212, PSI_packet is transferred to the FIFO 128 from the PSI/RAM 126. If not, in step S213, the PCR transmission period defined in the ITU-T Recommendation H. 222.0: ISO/IEC 13818-1 is checked. When the multiplexing is necessary, in step S214 the PCR value is sent to PCR bus 117 from the PCR generator 107 via the bi-directional buffers 118, 106, and transferred to the FIFO 128 via a buffer 125.

Conversely, when it is still not time to multiplex, it is determined in step S215 whether the transport stream packet effective for the RAM 122 is present. When the packet is present, in step S216 the data of the RAM 122 is transferred to the FIFO 128 via the buffer 127. After the data of the RAM 122 is transferred, the data "0xFF" (stuffing byte) is written to the RAM 122 from the CPU 124 via the bi-directional buffer 121, and the RAM is again initialized.

When there is no transport stream packet effective for the RAM 122, in step S217 Null_packet conforming to the ITU-T Recommendation H-222.0: ISO/IEC 13818-1 is written to the FIFO 128. After the above-described step is performed, the process returns to the step S204, thereby repeating the same operation.

As described above, according to the present embodiment, by adding the flag whose code length can be identified as the auxiliary information to the video PES which is a variable length packet, the code length of the variable length can easily be detected. During the transport stream packetizing, since the reading from each buffer is controlled in accordance with the code length, the efficient packetizing can be performed.

Moreover, the increase of programs to be multiplexed can easily be processed without increasing hardware circuits. Furthermore, the data wiring for transmission/reception between a plurality of encoders and multiplexers does not have to be increased.

Another embodiment will next be described.

Figure 8:
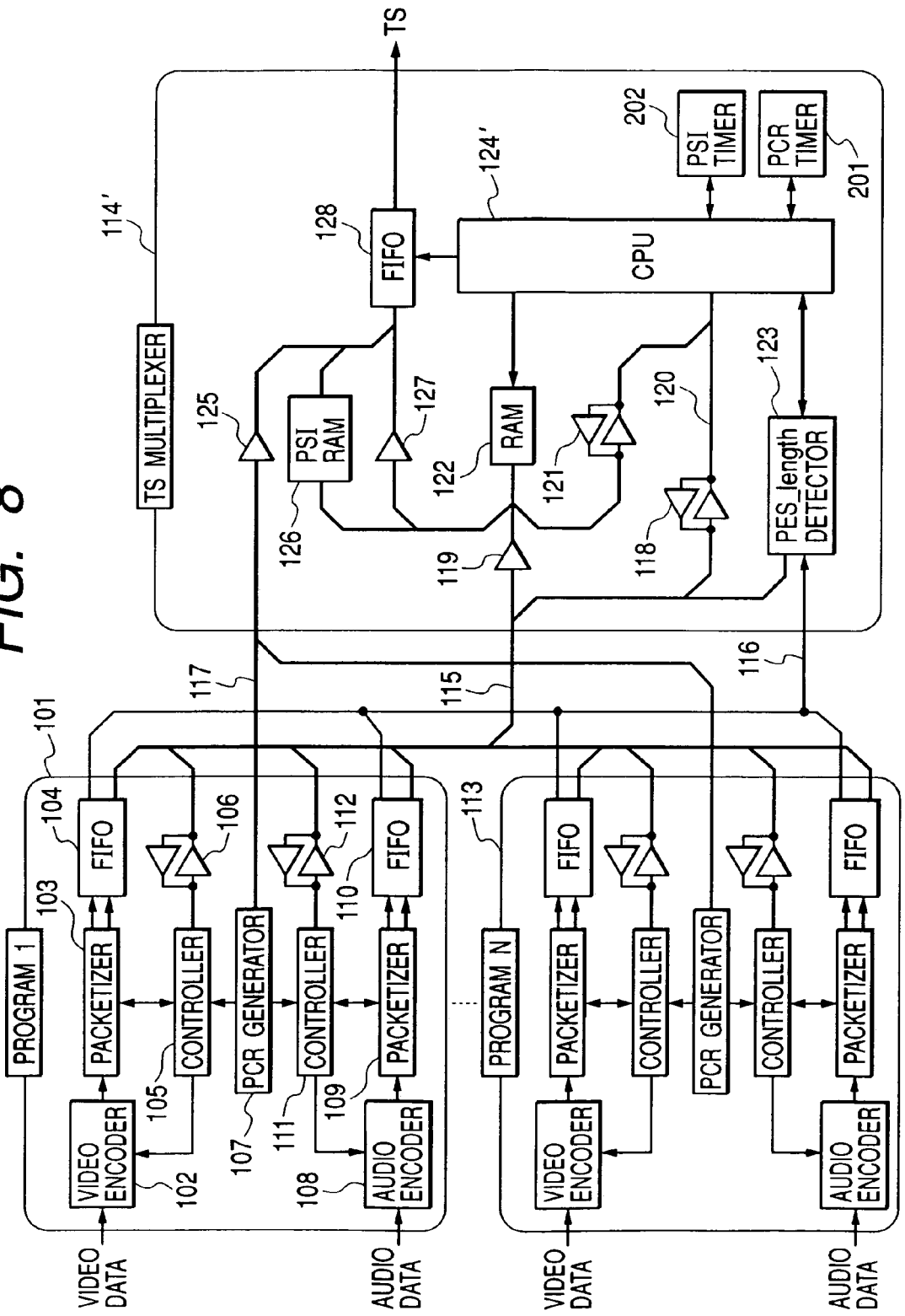
FIG. 8 is a block diagram showing the constitution of the digital transmission apparatus according to the present embodiment.

In this embodiment, the TS multiplexer 114 of FIG. 4 is changed to the constitution of a TS multiplexer 114' shown in FIG. 8, and the other constitutions are the same as those of FIG. 4. Additionally, in FIG. 8 the same parts as those of FIG. 4 are denoted with the same reference numerals, and the description thereof is omitted.

In the present embodiment, a PCR timer 201 and a PSI timer 202 are newly disposed.

The PCR timer 201 counts the periods of program_clock_reference_base and program_clock_reference_extension (multiplexed elapse time). Moreover, the PSI timer 202 counts the period of PSI (multiplexed elapse time).

A CPU 124' controls the multiplexing based on outputs of the PCR timer 201 and PSI timer 202, and feedback-controls the PCR timer 201 and PSI timer 202.

Figure 9B:
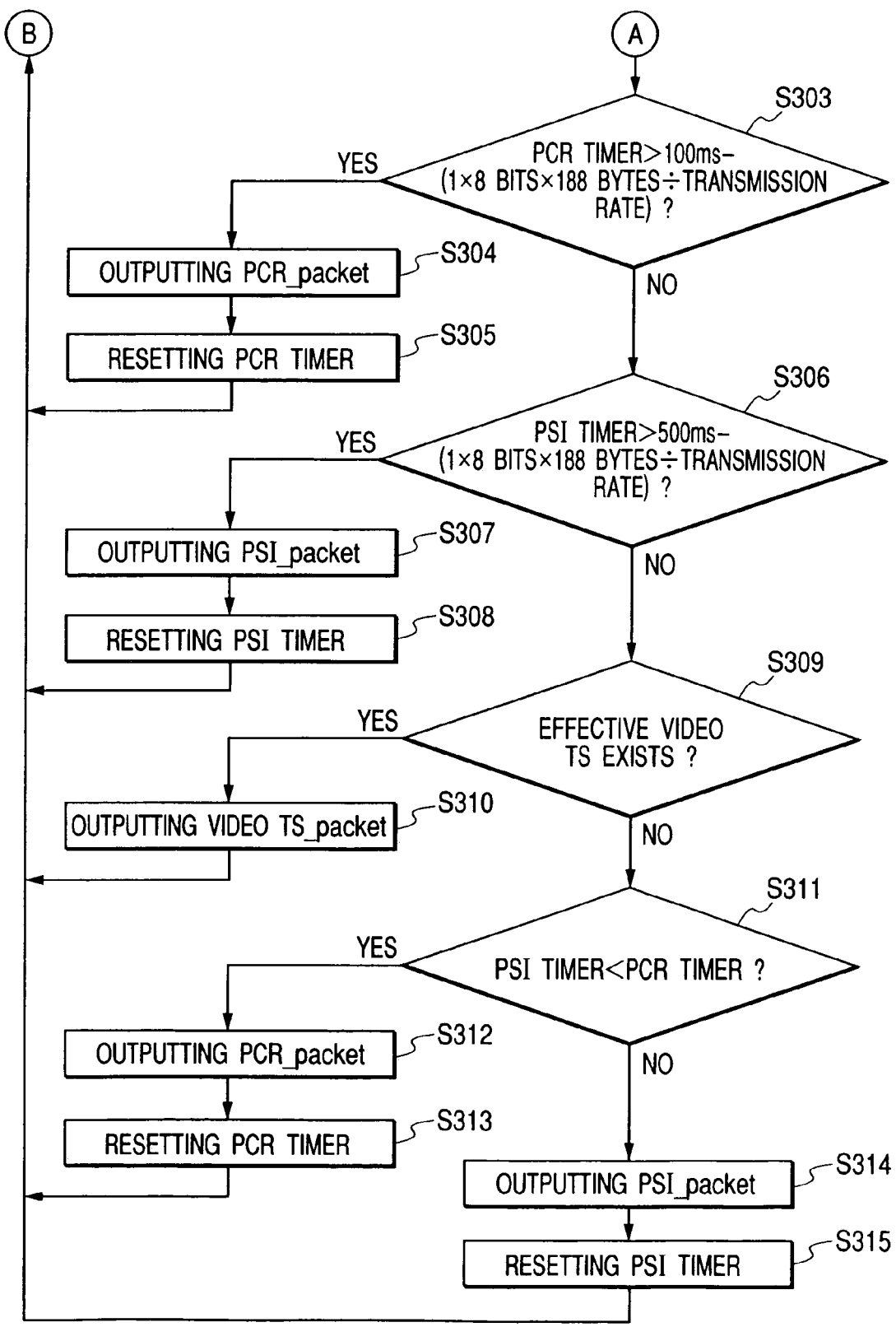
FIG. 9 is comprised of FIGS. 9A and 9B are flowcharts showing the operation of the digital transmission apparatus of FIG. 8.

A detailed processing operation in the digital transmission apparatus constituted as described above will be described hereinafter with reference to a flowchart of FIG. 9. Additionally, in FIG. 9 the processing similar to that of FIG. 6 is denoted with the same step numeral, and the description thereof is omitted.

First, in step S201', each program state is grasped from the CPU 124 via the CPU data bus 120 and bi-directional buffers 118, 106, 112, parameters, and the like necessary for encoding are supplied in accordance with each state, and the controllers 105, 111 are controlled. The controllers 105, 111 controlled by the CPU 124 control the encoders 102, 108, respectively. Furthermore, the PCR timer 201 and PSI timer 202 are reset. After the PCR timer 201 and PSI timer 202 are reset, they operate in real time.

In step S303, the value of the PCR timer 201 is read, and compared with a predetermined value. Here, the predetermined value is obtained by subtracting the time for transmitting 188 bytes for one transport stream packet from 100 ms which is the upper limit of the transmission cycle of the PCR field defined in the ITU-T Recommendation H. 222.0: ISO/IEC 13818-1, and it is determined whether or not the value of the PCR timer 201 exceeds this predetermined value.

As a result of the determination, if the value exceeds the predetermined value, the process advances to step S304. If not, the process advances to step S306.

In the step S304, when the value of the PCR timer 201 exceeds the predetermined value as the result of the determination of the step S303, the PCR value is transmitted to the PCR bus 117 from the PCR generator 107 via the bi-directional buffers 118, 106, and transferred to the FIFO 128 via the buffer 125, and the PCR packet is outputted.

After the PCR packet is outputted in the step S304, in step S305 the PCR timer 201 is reset. Then, after turning back to the step S204, the subsequent processing steps are repeatedly executed.

In step S306, when the value of the PCR timer 201 does not exceed the predetermined value as the determination result of the step S303, the value of the PSI timer 202 is read, and compared with the predetermined value. Here, by considering an image restoring time during decoding the predetermined value is set to a value obtained by subtracting time to transmit 188 bytes for one transport stream packet from 500 ms, and it is determined whether or not this predetermined value exceeds the value of the PSI timer 202.

When the value exceeds the predetermined value as the determination result, the process advances to step S307. If not, the process advances to step S309.

In the step S307, when the value of the PSI timer 202 exceeds the predetermined value as the determination result of the step S306, PSI_packet is transferred to the FIFO 128 from the PSI/RAM 126, and a PSI packet is outputted.

After the PSI packet is outputted in the step S307, in step S308 the PSI timer 202 is reset. Then, after turning back to the step S204, the subsequent processing steps are repeatedly executed.

In step S309, when the value of the PCI timer 202 does not exceed the predetermined value as the determination result of the step S306, it is determined whether the transport stream packet effective for the RAM 122 is present. When the packet is present, the process advances to step S310. If not, the process advances to step S311.

In the step S310, when the transport stream packet effective for the RAM 122 is present, the data of the RAM 122 is transferred to the FIFO 128 via the buffer 127. After the data of the RAM 122 is transferred, the data "0xFF" (stuffing byte) is written to the RAM 122 from the CPU 124 via the bi-directional buffer 121, and the RAM is again initialized. Subsequently, after returning to the step S204, the subsequent processing steps are repeatedly executed.

In the step S311, when there is no video transport stream packet effective for a multiplexing buffer 204 as the determination result of step S309, the value of the PCR timer 201 read in the step S303 is compared with the value of the PSI timer 202 read in the step S306, and it is determined whether or not the value of the PCR timer 201 exceeds the value of the PSI timer 202.

When the value of the PCR timer 201 exceeds the value of the PSI timer 202 as the determination result, the process advances to step S312. If not, the process advances to step S314.

In the step S312, when the value of the PCR timer 201 exceeds the value of the PSI timer 202 as the determination result of the step S311, the PCR value is transmitted to the PCR bus 117 from the PCR generator 107 via the bi-directional buffers 118, 106, and transferred to the FIFO 128 via the buffer 125, and the PCR packet is outputted.

After the PCR packet is outputted in the step S312, in step S313 the PCR timer 201 is reset. Then, after returning to the step S204, the subsequent processing steps are repeatedly executed.

In the step S314, when the value of the PCR timer 201 does not exceed the value of the PSI timer 202 as the determination result of the step S311, PSI_packet is transmitted to the FIFO 128 from the PSI/RAM 126, and the PSI packet is outputted.

After the PSI packet is outputted in the step S314, in step S315 the PSI timer 202 is reset. Then, after returning to the step S204, the subsequent processing steps are repeatedly executed.

By executing the above-described processing steps, no wasteful stuffing packet for attaining a fixed rate is inserted when the variable length video PES is multiplexed with the fixed length transport stream packet. Even before reaching the defined insertion cycle, the PCR packet or the PSI packet is inserted, so that the wasteful stuffing can be eliminated.

Specifically, in the present embodiment, since PCR and PSI are multiplexed in accordance with the generated amount of variable length encoded data, no wasteful information is transmitted onto the transmission line. Therefore, the data transmission can efficiently be performed.

Moreover, the PCR multiplexing period is variable, and transmission errors can effectively be solved. Furthermore, since the PSI multiplexing period is also variable, the image restoring time can be shortened.

As the number of programs to be multiplexed increases, the above-described effect increases, so that according to the present embodiment, the efficient data transmission can be performed by effectively utilizing the transmission line.

Additionally, the present invention is not limited to the apparatus of the above-described embodiment, and can be applied to a system constituted of a plurality of apparatuses (e.g., a host computer, an interface apparatus, and the like), or to an equipment constituted of one apparatus (e.g., a digital VTR, a digital video camera, and the like).

Moreover, to realize the function in the above-described embodiment, the program code of software for realizing the function of the above-described embodiment is supplied to the apparatus connected to various devices so as to operate the devices or the computer in the system, and the system or apparatus computer (CPU, MPU, and the like) operates the devices according to the supplied program code. This embodiment is also included in the present invention. In this case, the program code itself of the software realizes the function in the above-described embodiment, and the present invention is constituted by the program code itself, and means for supplying the program code to the computer, such as the storage medium in which the program code is stored.

As the storage medium for storing the program code, for example, a floppy disk, a hard disk, an optical disk, an optical magnetic disk, a CD-ROM, a CD-R, a magnetic tape, a nonvolatile memory card, a ROM, and the like can be used.

Moreover, not only when the function of the above-described embodiment is realized by executing the supplied program code by the computer, but also when the program code realizes the function in the above-described embodiment in cooperation with the operating system (OS) operating in the computer, or other applications, such program code is of course included in the present invention.

Furthermore, after the supplied program code is stored in the memory disposed in the function expansion board of the computer or the function expansion unit connected to the computer, the CPU, and the like disposed in the function expansion board and function expansion unit perform a part or the whole of the actual processing based on the instruction of the program code, and the function of the above-described embodiment is realized by the processing. This case is also included in the present invention.

In other words, the foregoing description of embodiments has been given for illustrative purposes only and not to be construed as imposing any limitation in every respect.

The scope of the invention is, therefore, to be determined solely by the following claims and not limited by the text of the specifications and alternations made within a scope equivalent to the scope of the claims fall within the true spirit and scope of the invention.

What is claimed is:

1. An information processing apparatus comprising:
  a) input means for inputting variable length packet data including packet length information indicative of a packet length and encoded information data;
  b) judgment means for judging the packet length of the variable length packet data; and
  c) packet generating means for generating the variable length packet data into fixed length packet data in accordance with an output of said judgment means, and transmitting the fixed length packet data,
  wherein said packet generating means includes memory means for generating fixed length data and initializing means for initializing beforehand said memory means by writing stuffing data in said memory means, and said packet generating means generates the fixed length data by overwriting the variable length packet data into the initialized memory means in accordance with the packet length judged by said judgment means and reading out the data from said memory means, and said packet generating means generates the fixed length packet data in which the stuffing data is written, in case that the variable length packet data to be written into said memory means is shorter than a predetermined length.

2. An apparatus according to claim 1, further comprising:
  clock reference information generating means for generating clock reference information for use in a time reference during decoding of the encoded information data,
  wherein said packet generating means transmits at least one fixed length packet data provided with the clock reference information generated by said clock reference information generating means within a predetermined time interval.

3. An apparatus according to claim 2, further comprising:
  program specific information generating means for generating program specific information indicative of a program specific of a packet to be transmitted, wherein said packet generating means transmits at least one fixed length packet data provided with the program specific information generated by said program specific information generating means within the predetermined time interval.

4. An apparatus according to claim 1, wherein said input means inputs a plurality of types of variable length packet data.

5. An apparatus according to claim 2, wherein said packet generating means transmits the fixed length packet data provided with the clock reference information, when no effective fixed length packet data is present.

6. An apparatus according to claim 3, wherein said packet generating means transmits the fixed length packet data provided with the program specific information, when no effective fixed length packet data is present.

7. An apparatus according to claim 1, wherein the variable length packet data is Packetized Elementary Stream (PES) conforming to ISO/IEC 13818-1, and the fixed length packet data is Transport Stream (TS) conforming to ISO/IEC 13818-1.

8. An apparatus according to claim 2, wherein the clock reference information is Program Clock Reference (PCR) conforming to ISO/IEC 13818-1.

9. An apparatus according to claim 2, wherein the program specific information is Program Specific Information (PSI) conforming to ISO/IEC 13818-1.

10. An apparatus according to claim 7, wherein the information data is image data, and is encoded in conformity with ISO/IEC 13818-2.

11. An apparatus according to claim 1, wherein said packet generating means inserts a stuffing byte when the code length of the variable length packet data is less than the code length which can be inserted to the fixed length packet data.

12. An information processing method comprising the steps of:
inputting variable length packet data including packet length information indicative of a packet length and encoded information data;
judging the packet length of the variable length packet data; and
generating the variable length packet data into fixed length packet data in accordance with the judgment result and transmitting the fixed length packet data,
wherein said generating step includes a step of initializing beforehand memory means for generating fixed length data, by writing stuffing data in said memory means in advance, said generating step generates the fixed length data by overwriting the variable length packet data into the initialized memory means in accordance with the packet length judged in said judging step and reading out the data from said memory means, and said generating step includes a step of generating the fixed length packet data in which the stuffing data is written, in case that the variable length packet data to be written into said memory means is shorter than a predetermined length.

13. A storage medium in which an information processing program according to claim 12 is stored and which can be read by a computer.

14. An information processing apparatus comprising:
a) an input portion, which inputs variable length packet data including packet length information indicative of a packet length and encoded information data;
b) a judgment portion, which judges the packet length of the variable length packet data; and
c) a packet generating portion, which generates the variable length packet data into fixed length packet data in accordance with an output of said judgment portion, and transmits the fixed length packet data,
wherein said packet generating portion includes memory for generating fixed length data and initializing means for initializing beforehand said memory by writing stuffing data in said memory, and said packet generating portion generates the fixed length data by overwriting the variable length packet data into the initialized memory in accordance with the packet length judged by said judgment portion and reading out the data from said memory, and said packet generating portion generates the fixed length packet data in which the stuffing data is written, in case that the variable length packet data to be written into said memory is shorter than a predetermined length.

* * * * *

UNITED STATES PATENT AND TRADEMARK OFFICE
CERTIFICATE OF CORRECTION

| | | |
|---|---|---|
| PATENT NO. | : 7,215,671 B1 | Page 1 of 1 |
| APPLICATION NO. | : 09/525056 | |
| DATED | : May 8, 2007 | |
| INVENTOR(S) | : Katsumi Karasawa | |

It is certified that error appears in the above-identified patent and that said Letters Patent is hereby corrected as shown below:

ITEM [57] ABSTRACT

Line 2, "comprises" should read --that comprises--.

COLUMN 1

Line 63, "memories 306'," should read --memories 306,--.

COLUMN 4

Line 20, "6B are" should read --6B, which are--.
Line 28, "9B are" should read --9B, which are--.

COLUMN 10

Line 26, "alternations" should read --alterations--.

Signed and Sealed this

Fifth Day of August, 2008

JON W. DUDAS
*Director of the United States Patent and Trademark Office*